3,271,340
OLEFIN POLYMERS MODIFIED WITH
POLYPROPYLENE WAX
Newton H. Shearer, Jr., James E. Guillet, and Harry W. Coover, Jr., Kingsport, Tenn., assignors to Eastman Kodak Company, Rochester, N.Y., a corporation of New Jersey
No Drawing. Filed Dec. 30, 1960, Ser. No. 79,516
18 Claims. (Cl. 260—28.5)

This invention relates to α-olefin polymer compositions exhibiting improved physical properties. More particularly, this invention relates to compositions comprising polymers of α-olefins with polypropylene waxes. In a specific aspect, this invention concerns α-olefin polymer compositions exhibiting improved physical properties, including excellent melt flow, stiffness, and tensile yield strength.

It is well known in the polymer field that α-olefins, for example, propylene, butene-1, 3-methyl-1-butene, and 4-methyl-1-pentene, can be polymerized to form normally solid polymers exhibiting widely differing physical properties, such as melt flow, tensile strength, stiffness, and impact strength. These polymers, depending upon the level of the particular properties exhibited, are employed, for example, in the formation of fibers, films, polymer solutions, and molded articles. However, for a particular purpose, it is desirable to improve one or more of the physical properties of these polymers. Attempts have been made to accomplish such improvements in properties by the addition to the polymer of a great many materials such as microcrystalline hydrocarbon waxes, metal salts of long chain fatty acids, paraffin waxes and the like. However, while some specific physical property is improved in the resulting compositions, it is usually at the expense of some other property or properties. Hence, until the present invention there has been a significant lack of success in providing α-olefin polymer compositions in which specific properties are improved without materially downgrading the other physical properties of the polymer.

Accordingly, it is an object of this invention to provide new and improved α-olefin polymer compositions.

Another object of this invention is to provide new and improved α-olefin polymer compositions exhibiting significantly improved properties when compared with the same α-olefin polymers employed in the compositions.

Another object of this invention is to provide α-olefin polymer compositions exhibiting excellent melt flow, tensile strength, and stiffness without materially downgrading the other physical properties of the polymer.

Still another object of this invention is to provide polypropylene compositions having exceptional tensile yield strength, higher stiffness, as well as improved melt flow for a given impact strength when compared with conventional polypropylene having the same inherent viscosity as the polypropylene employed in the composition.

Further objects and advantages of the invention will be apparent to those skilled in the art from the following disclosure and claims.

In accordance with this invention, it has been found that normally solid α-olefin polymers, when blended with polypropylene waxes, as described herein, result in new compositions exhibiting outstanding physical properties. Hence, polymer blends of normally solid α-olefin polymers containing about 3 to about 50%, and more preferably about 5 to about 40% by weight, based on the blend, of one or more polypropylene waxes, as hereinafter described, have been found to exhibit improved properties, including increased tensile yield strengths, increased stiffness in flexure and improved melt flow at high shear rates, when compared with the same normally solid α-olefin polymers containing no polypropylene wax.

In general, it has been found that a polypropylene wax having a density of at least 0.88 and preferably in the range of about 0.90 to about 0.92, an inherent viscosity in the range of about .05 to about .5 and more preferably in the range of about 0.1 to about 0.4 in Tetralin at 145° C. and a melting point in the range of about 130° to about 180° C. and more preferably in the range of about 150° to about 170° C. will impart the desired improvement in properties to normally solid polymers of α-olefins, and particularly those α-olefins containing at least 3 carbon atoms. The molecular weights of these polymers are in the range of about 500 to about 10,000, as indicated by their inherent viscosities in Tetralin at 145° C.

In the practice of this invention, it is preferred to employ about 3 to about 50% by weight of the polypropylene wax and about 97 to about 50% by weight, of the solid α-olefin polymer in making the blend. However, intermediate concentrations are operable and concentrations of about 5 to about 40% by weight, based on the blend, of polypropylene wax give excellent results. In general, concentrations of about at least 5% by weight of polypropylene wax are preferred even though as little as 3% by weight of this wax based on the blend can be employed to improve the properties of the normally solid α-olefin polymers. The polymer and wax blend can, of course, contain minor quantities of other ingredients, for example stabilizing agents, compatible resins, reinforcing agents, plasticizing agents, or other compounding materials known to be useful in such blends. It is obvious that such other ingredients should not be present in quantities such as will prevent the desired improvement in physical properties from being imparted to the normally solid α-olefin polymer.

A wide variety of normally solid α-olefin polymers can be employed in the practice of this invention. Hence, any of the well known normally solid hydrocarbon polymers of α-olefins containing at least 3 carbon atoms having a molecular weight of about 20,000 or higher, when blended with polypropylene wax according to this invention, will show a significant improvement in several physical properties without any material downgrading of the other physical properties of the polymer. In general, however, the polymers of α-olefins containing at least 3 carbon atoms are characterized by densities of at least 0.80 and preferably in the range of about 0.82 to about 1.08, inherent viscosities in the range of about .9 to about 5 and preferably in the range of about 1.1 to about 4 in Tetralin at 145° C. and melting points in the range of about 45° C. to about 350° C. and more preferably in the range of about 100° to about 250° C. Although any of the aforementioned polymers can be used in the practice of this invention, it is preferred that the normally solid hydrocarbon polymer be one formed from one or more of the well known polymerizable aliphatic α-mono-olefins containing 3 to 10 carbon atoms and more preferably 3 to 8 carbon atoms which polymer is characterized by a density of at least 0.87 and preferably in the range of about 0.90 to about 0.93, an inherent viscosity in the range of about 0.9 to about 5.0 and preferably in the range of about 1.1 to about 4.0 in Tetralin at 145° C. and a melting point in the range of about 150° to about 250° C. and preferably in the range of about 200° to about 250° C. Copolymers of the aforementioned aliphatic α-monoolefins with ethylene give particularly good results when employed in this invention as illustrated by Example 5. Examples of polymerizable α-olefins which can be employed to form the solid hydrocarbon polymers employed in this invention include propylene, butene-1, isobutene, 1,3-butadiene, styrene, α-methylstyrene, pentene, decene, dodecene, octene, hexene, heptene, 3 - methyl - 1 - butene, 4 - methyl-1-pentene, 4-methyl-1-hexene,, 1,4-pentadiene, 1,5-hexadiene, 6-methyl-1-heptene, 3-phenyl-1-butene, 4-phenyl-1-butene, allylbenzene, allylcyclopentane, allylcyclohexane and the like.

Blends of the normally solid hydrocarbon α-olefin polymers with one or more of the polypropylene waxes described herein can be prepared in any desired manner, whether it be mechanical mixing or other blending method. Thus, they can be prepared at elevated temperatures on rolls, in a Banbury mixer or any other suitable type of processing equipment. For example, the granular polypropylene wax can be blended with the normally solid α-olefin polymer in pellet form followed by re-extrusion of the blend. This re-extrusion can be carried out at the minimum temperature to melt and extrude the material or at some higher temperature which produces a slight degree of degradation in molecular weight of the total blend. A blend made by extrusion at high temperatures is lower in melt viscosity than that which would result from an extrusion at the minimum temperature conditions.

This invention can be further illustrated by the following examples of preferred embodiments thereof although it will be understood that these examples are included merely for purposes of illustration and are not intended to limit the scope of the invention unless otherwise specifically indicated:

*Example 1.*—Four blends are prepared by extruding mixtures of polypropylene wax (.15 I.V. in Tetralin at 145° C.) and high-molecular-weight polypropylene (4.0 I.V.) at temperatures within the range of 285° to 315° C. at a rate of about 3 lb./hr. through a 1¾ in. extruder. When the higher temperatures are employed some degradation of molecular weight occurs concurrently with extrusion and faster flow rates are obtained, as shown by columns 4 and 5 of Table I which follows. In each case, the blended composition shows unexpectedly high tensile yield strength and stiffness values when compared with conventional polypropylene (1.8 I.V.) which is not blended with the wax. A comparison of the physical properties exhibited by the aforementioned blends and those of the polypropylene, unmodified by polypropylene wax, are set forth in the following table.

TABLE I

|  | 1 | 2 | 3 | 4 | 5 |
|---|---|---|---|---|---|
|  | Conventional Polypropylene (1.8 I.V.) | 10% by wgt., Polypropylene Wax (0.15 I.V.); 90% by wgt., Polypropylene (4.0 I.V.) | 30% by wgt., Polypropylene Wax (0.15 I.V.); 70% by wgt., Polypropylene (4.0 I.V.) | 15% by wgt., Polypropylene Wax (0.15 I.V.); 85% by wgt., Polypropylene (4.0 I.V.) | 30% by wgt., Polypropylene Wax (0.37 I.V.); 70% by wgt., Polypropylene (4.0 I.V.) |
| Extrusion temperature, ° C. |  | 285 | 285 | 300 | 315 |
| Melt flow, 3.8 kg. load at 230° C., dg. per min. (ASTM D1238) | 7.0 | 0.18 | 0.18 | 1.0 | 13.0 |
| Tensile strength at upper yield, 2 in. per min. strain rate, p.s.i. (ASTM D638) | 4,900 | 5,600 | 5,500 | 5,300 | 5,500 |
| Stiffness in flexure, p.s.i. ×10³ (ASTM D747) | 113 | 137 | 156 | 147 | 145 |
| Izod impact strength, ft.-lb. per in. of notch at 23° C. (ASTM D256) | 0.64 | 2.76 | 1.26 | 0.96 | 0.35 |

From the results set out in Table I above, it will be observed that the combination of the low inherent viscosity polypropylene wax and the high molecular weight polypropylene (molecular weight approximately 200,000) provides physical properties which are significantly superior to those of the conventional polypropylene. Hence, comparing the results of columns 2–5 with column 1, the superior level of properties found in the blended compositions is readily apparent with tensile yield strengths of 5300 to 5600 p.s.i. and stiffness of 137 to 156×10³ p.s.i. as compared with the corresponding 4900 p.s.i. and 113×10³ values exhibited by the conventional polypropylene unmodified by polypropylene wax. Furthermore, it is readily apparent from an examination of the above table that exceptionally high tensile yield strengths and stiffness can be obtained over a wide range in flow rates and Izod impact strengths.

*Example 2.*—As indicated above, the polypropylene wax employed in this invention can have an inherent viscosity as low as .05 in Tetralin at 145° C. and it can be employed in concentrations up to about 50% by weight, based on the blend. To illustrate, six blends containing 5 to 50% by weight, based on the blend, of polypropylene wax having an inherent viscosity of .05 to .45 in Tetralin at 145° C. and 95 to 50% by weight of high inherent viscosity plastic-grade polypropylene (molecular weight approximately 150,000) are prepared according to the procedure of Example 1. In each case, the blends are extruded under controlled temperature conditions so as to arrive at essentially the same melt flow as that of the same propylene homopolymer, unmodified by polypropylene wax. The physical properties exhibited by these blends are set forth in Table II which follows:

TABLE II

|  | 1 | 2 | 3 | 4 | 5 | 6 |
|---|---|---|---|---|---|---|
|  | 5% by wgt., Polypropylene Wax (0.05 I.V.); 95% by wgt., Polypropylene (3.5 I.V.) | 15% by wgt., Polypropylene Wax (0.05 I.V.); 85% by wgt., Polypropylene (3.5 I.V.) | 30% by wgt., Polypropylene Wax (0.05 I.V.); 70% by wgt., Polypropylene (3.5 I.V.) | 15% by wgt., Polypropylene Wax (0.45 I.V.); 85% by wgt., Polypropylene (3.5 I.V.) | 30% by wgt., Polypropylene Wax (0.45 I.V.); 70% by wgt., Polypropylene (3.5 I.V.) | 50% by wgt., Polypropylene Wax (0.45 I.V.); 50% by wgt., Polypropylene (3.5 I.V.) |
| Flow rate, 3.8 kg. load at 230° C. dg. per min. (ASTM D1238) | 7.0 | 7.0 | 8.0 | 7.0 | 6.0 | 12.0 |
| Tensile strength at upper yield, 2 in. per min. strain rate, p.s.i. (ASTM D638) | 5,200 | 5,400 | 5,500 | 5,100 | 5,200 | 5,400 |
| Stiffness in flexure, p.s.i. ×10³ (ASTM D747) | 130 | 145 | 154 | 125 | 133 | 140 |
| Izod impact strength, ft.-lb. per in. of notch at 23° C. (ASTM D256) | 1.01 | 0.79 | 0.31 | 0.86 | 0.59 | 0.53 |

The superiority in physical properties exhibited by the novel compositions of this invention becomes obvious from a comparison of the values set forth in the above table and those in column 1, Table I. Hence, the blends set forth in Table II exhibit exceptionallyy high yield strengths ranging from 5100 to 5500 p.s.i. and stiffnesses ranging from 130,000 to 154,000 p.s.i. Generally high Izod impact strengths are observed for these blends and, in addition, the composition whose properties are given in column 6 exhibits an increased flow rate indicative of outstanding moldability.

*Example 3.*—As already indicated, the invention is not limited to the use of polymers having a very high inherent viscosity and is effective with polymers having a relatively low inherent viscosity within the range of about .9 to about 5. Hence, three blends are prepared by extruding mixtures of polypropylene wax (0.1 I.V.) with polyproplyene having an inherent viscosity of only 1.5 in Tetralin at 145° C. (molecular weight approximately 55,000) at a temperature of 280° C. at a rate of about 50 lb./hour through a 1¾ inch extruder. The physical properties exhibited by these blends are set forth in the following table:

TABLE III

|  | 1<br>5% by wgt., Polypropylene Wax (0.1 I.V.); 95% by wgt., Polypropylene (1.5 I.V.) | 2<br>15% by wgt., Polypropylene Wax (0.1 I.V.); 85% by wgt., Polypropylene (1.5 I.V.) | 3<br>30% by wgt., Polypropylene Wax (0.1 I.V.); 70% by wgt. Polypropylene (1.5 I.V.) |
|---|---|---|---|
| Flow rate, 2.16 kg. load at 230° C., dg. per min. (ASTM D1238) | 20 | 35 | 60 |
| Tensile strength at upper yield, 2 in. per min. strain rate, p.s.i. (ASTM D638) | 5,500 | 5,700 | 6,000 |
| Stiffness in flexure, p.s.i. ×10$^5$ | 155 | 155 | 160 |
| Izod impact strength, ft.-lb. per in. of notch at 23° C. (ASTM D256) | 0.55 | 0.38 | 0.26 |

From an examination of the above table it can be seen that the compositions set forth possess exceptionally high tensile yield strengths and high stiffnesses. In addition, these compositions exhibit outstanding melt flow rates making it possible to obtain fibers having tenacities of 8 to 9 grams per denier and very low boiling water shrinkages of 2% or less.

*Example 4.*—The blending operation, as pointed out herein, can be accomplished by using a heated roll and one or more polymers can be employed in making the composition. In addition, the blends can contain minor amounts of other ingredients, for example, antioxidants. To illustrate, two blends are prepared by milling the materials specified in the following table on rolls heated to 200° C. Additional heat is imparted to the aforementioned materials as a result of friction encountered in milling upon the rolls. An antioxidant, butylated hydroxy toluene, is added to each blend in concentrations of 0.3%, by weight, to prevent oxidation of the polypropylene during milling on the open rolls. The milling operation is carried out in approximately 15 minutes giving compositions having the physical properties set forth in the following table:

TABLE IV

|  | 1<br>20% by wgt., Polypropylene Wax (0.2 I.V.); 60% by wgt., Polypropylene (1.1 I.V.); 20% by wgt., Polypropylene (1.6 I.V.) | 2<br>15% by wgt., Polypropylene Wax (0.14 I.V.); 85% by wgt., Polypropylene (4.2 I.V.) |
|---|---|---|
| Flow rate, 2.16 kg. load at 230° C., dg. per min. (ASTM D1238) | 65 | 0.3 |
| Tensile strength at upper yield, 2 in. per min. strain rate, p.s.i. (ASTM D638) | 5,100 | 5,800 |
| Stiffness in flexure, p.s.i. ×10$^5$ (ASTM D747) | 206 | 159 |
| Izod impact strength ft.-lb. per in. of notch at 23° C. (ASTM D256) | 0.23 | 3.1 |

The blend comprising polypropylene wax and the two relatively low inherent viscosity propylene polymers (molecular weights of approximately 36,000 and 60,000), as set forth in column 1 above, is extremely useful in the preparation of strong fibers exhibiting low boiling water shrinkage. In contrast, the composition described in column 2 above is a very high impact molding material having high tensile yield strength, high stiffness and outstanding impact strength.

*Example 5.*—The polypropylene waxes described herein can be used to improve the physical properties of the well known solid α-olefin polymers and particularly those homopolymers of α-olefins containing at least 3 carbon atoms and copolymers of these α-olefins with other α-olefinic hydrocarbons, including for example, ethylene. To illustrate this aspect of the invention propylene wax and several α-olefin copolymers are blended according to the procedure set forth in Example 1. The physical properties of these blends are given in Table V, which follows. By comparing the values given in columns 2 and 3 with those given in column 1 it can be seen that improved tensile strength and stiffness are imparted by the incorporation of polypropylene wax into the copolymer.

TABLE V

|  | 1<br>95/5 copolymer of propylene and ethylene | 2<br>15% by wgt., Polypropylene Wax (0.1 I.V); 85% by wgt., 95/5 copolymer of propylene and ethylene (1.6 I.V.) | 3<br>30% by wgt., Polypropylene Wax (0.1 I.V); 70% by wgt., 95/5 copolymer of propylene and ethylene (1.6 I.V.) | 4<br>90/10 copolymer of 3-methyl-1-butene and propylene (1.4 I.V.) | 5<br>15% by wgt., Polypropylene Wax (0.1 I.V.); 85% by wgt., 90/10 copolymer of 3-methyl-1-butene and propylene (1.4 I.V.) |
|---|---|---|---|---|---|
| Flow rate, 2.16 kg. load at 230° C., dg. per min. (ASTM D1238) | 7.0 | 7.0 | 8.0 | 6.0 | 7.0 |
| Tensile strength at upper yield 2 in. per min. strain rate, p.s.i. (ASTM D638) | 2,900 | 3,200 | 3,600 | 3,500 | 4,000 |
| Stiffness in flexure, p.s.i. ×10$^3$ (ASTM D747) | 54 | 69 | 72 | 70 | 81 |
| Izod impact strength, ft.-lb. per in. of notch at 23° C. (ASTM D256) | 7.9 | 2.46 | 1.35 | 1.70 | 1.31 |

NOTE.—The integers given in the above table and those which follow indicating the composition of the copolymers are based on weight percent.

*Example 6.*—Blends containing poly(1-butene) and copolymers of 1-butene and 4-methyl-1-pentene are prepared according to the procedure set forth in Example 1. The superior properties exhibited by these blends are set forth in the following table. A comparison between the values set forth in columns 1–5 clearly establishes the superiority in properties effected by blending with the polypropylene wax.

the same test of about 1.0 to 20.0, are extremely useful as molding materials and in film extrusion. In addition, the relatively low melt viscosity materials, i.e. those having a melt flow under condition I of the same test of 20 to 100 or higher are quite useful in providing high tenacity fibers of high softening point, excellent elastic recovery, and a very low boiling water shrinkage of 2% or less.

Although the invention has been described in con-

TABLE VI

| | 1 | 2 | 3 | 4 | 5 |
|---|---|---|---|---|---|
| | Poly-1-butene (1.2 I.V.) | 15% by wgt., Polypropylene Wax (0.5 I.V.) 85% by wgt., poly-1-butene (1.2 I.V.) | 30% by wgt., Polypropylene Wax (0.5 I.V.) 70% by wgt., poly-1-butene (1.2 I.V.) | 95/5 copolymer of 4-methyl-1-pentene and 1-butene (1.6 I.V.) | 20% by wgt., Polypropylene Wax (0.1 I.V.) 80% by wgt., 95/5 copolymer of 4-methyl-1-pentene and 1-butene (1.6 I.V.) |
| Flow rate, 2.16 kg. load at 230° C., dg. per min. (ASTM D1238) | 7.0 | 7.0 | 14.0 | 8.0 | 12.0 |
| Tensile strength at upper yield, 2 in. per min. strain rate p.s.i. (ASTM D638) | 3,800 | 4,200 | 4,500 | 4,100 | 4,900 |
| Stiffness in flexure, p.s.i. $\times 10^5$ (ASTM D747) | 85 | 98 | 115 | 90 | 125 |
| Izod impact strength, ft.-lb. per inch of notch at 23° C. (ASTM D256) | 2.15 | 1.54 | 0.97 | 2.01 | 1.14 |

*Example 7.*—A blend of 8 parts of a 46/54 butadiene-styrene copolymer having an inherent viscosity of 5 in Tetralin at 145° C. (molecular weight approximately 300,000) and 2 parts of polypropylene wax having an inherent viscosity of 0.44 in Tetralin at 145° C. is prepared on the rolls of a rubber mill. This blend exhibits better electrical properties than the same copolymer, unmodified by polypropylene wax, in addition to increased tensile strength and stiffness.

The novel compositions which form this invention not only exhibit outstanding flow at low shear rates as indicated by the melt flow measurements set forth in the several tables herein, but the improved flow for a given impact strength over that of the normally solid α-olefin polymer unmodified by polypropylene wax is still further accentuated at high shear rates. As a result of the foregoing, these novel compositions are particularly valuable in a wide variety of injection molding and extrusion operations since they are more easily molded and shaped into intricate forms. The following table sets forth a comparison of flows observed for several of the novel compositions of this invention at low and high shear rates with the corresponding normally solid α-olefin polymer, unmodified by polypropylene wax.

siderable detail with reference to certain preferred embodiments thereof, it will be understood that variations and modifications can be effected without departing from the spirit and scope of the invention as described hereinabove and as defined in the appended claims.

We claim:
1. An α-olefin polymer blend exhibiting improved physical properties consisting essentially of (1) solid hydrocarbon polymer of an α-olefin containing 3–10 carbon atoms, said polymer having a density of at least 0.80, a melting point in the range of about 45° to about 350° C. and an inherent viscosity in the range of about .9 to about 5 in Tetralin at 145° C. and (2) about 3 to about 50% by weight, based on the composition, of polypropylene wax having a density of at least 0.88, a melting point in the range of about 130° to about 180° C. and an inherent viscosity in the range of about .05 to about .5 in Tetralin at 145° C.

2. An α-olefin polymer blend exhibiting improved physical properties consisting essentially of (1) solid hydrocarbon homopolymer of an α-olefin containing 3–10 carbon atoms, said homopolymer having a density of at least 0.80, a melting point in the range of about 45° to about 350° C. and an inherent viscosity in the range of

TABLE VII

| Example | Polypropylene Wax Inherent Viscosity | Percent by wgt., Wax | Inherent Viscosity of Polypropylene Base Material | Density of Polypropylene Base Material | Inherent Viscosity of Blend | Melt Flow, ASTM Condition I (Low Shear), g./10 min. | High Shear Flow, 1450 p.s.i.g. 230° C. g./min. |
|---|---|---|---|---|---|---|---|
| 1 | 0.27 | 23 | 4.26 | .908 | 2.25 | 0.59 | 14.7 |
| 2 | | None | 2.20 | .914 | 2.20 | 0.82 | 1.2 |
| 3 | 0.27 | 30 | 4.26 | .908 | 2.14 | 1.56 | 25.4 |
| 4 | | None | 2.19 | .916 | 2.17 | 1.35 | 1.0 |
| 5 | 0.14 | 20 | 2.60 | .912 | 1.85 | 1.81 | 23.3 |
| 6 | | None | 2.06 | .918 | 2.06 | 1.79 | 8.1 |

Thus, by the practice of this invention, there is provided novel normally solid α-olefin polymer compositions exhibiting superior tensile yield strengths and stiffness over the corresponding α-olefin polymers which compositions substantially maintain the other physical properties of the α-olefin polymers. These compositions can be employed as substitutes for the α-olefin polymers themselves wherever these superior properties are of significance. For example, the compositions exhibiting relatively high melt viscosity, i.e. a melt flow under condition I of ASTM D1238 Melt Index Test (230° C., 3.8 kg.) of about 1.0 or less, are very useful as high impact molding and extrusion materials while the compositions of moderate melt viscosity, i.e. with a melt flow under condition I of about .9 to about 5 in Tetralin at 145° C. and (2) about 3 to about 50% by weight, based on the composition, of polypropylene wax having a density of at least 0.88, a melting point within the range of about 130° to about 180° C. and an inherent viscosity in the range of about .05 to about .5 in Tetralin at 145° C.

3. An α-olefin polymer blend exhibiting improved physical properties consisting essentially of (1) solid hydrocarbon copolymer of an α-olefin containing 3–10 carbon atoms, said copolymer having a density of at least 0.80, a melting point in the range of about 45° to about 350° C. and an inherent viscosity in the range of about .9 to about 5 in Tetralin at 145° C. and (2) about 3 to about 50% by weight, based on the composition, of polypropylene wax having a density of at least 0.88, a melting point in the range of about 130° to about 180° C. and an inherent viscosity in the range of about .05 to about .5 in Tetralin at 145° C.

4. An α-olefin polymer blend exhibiting improved physical properties consisting essentially of (1) solid hydrocarbon homopolymer of an α-olefin containing 3–10 carbon atoms, said homopolymer having a density in the range of about 0.82 to about 1.08, a melting point in the range of about 100° to about 250° C. and an inherent viscosity in the range of about 1.1 to about 4 in Tetralin at 145° C. and (2) about 5 to about 40% by weight, based on the composition, of polypropylene wax having a density in the range of about .90 to about .92, a melting point in the range of about 150° to about 170° C. and an inherent viscosity in the range of about .1 to about .4 in Tetralin at 145° C.

5. An α-olefin polymer blend exhibiting improved physical properties consisting essentially of (1) solid hydrocarbon copolymer of an α-olefin containing 3–10 carbon atoms, said copolymer having a density in the range of about 0.80 to about 1.08, a melting point in the range of about 100° to about 250° C. and an inherent viscosity in the range of about 1.1 to about 4 in Tetralin at 145° C. and (2) about 5 to about 40% by weight, based on the composition, of polypropylene wax having a density in the range of about .90 to about .92, a melting point in the range of about 150° to about 170° C. and an inherent viscosity in the range of about .1 to about .4 in Tetralin at 145° C.

6. An α-olefin polymer blend exhibiting improved physical properties consisting essentially of (1) solid hydrocarbon polymer of an aliphatic α-monoolefin containing 3 to 10 carbon atoms, said polymer having a density of at least .87, a melting point in the range of about 150° to 250° C., an inherent viscosity in the range of about 1.1 to about 4.0 in Tetralin at 145° C. and (2) about 5 to about 40% by weight, based on the composition, of polypropylene wax having a density in the range of about .90 to about .92, a melting point in the range of about 150° to about 170° C. and an inherent viscosity in the range of about .1 to about .4 in Tetralin at 145° C.

7. An α-olefin polymer blend exhibiting improved physical properties consisting essentially of (1) polypropylene having a density of at least .87, a melting point in the range of about 45° to about 200° C. and an inherent viscosity in the range of about .9 to about 5 in Tetralin at 145° C. and (2) about 3 to about 50% by weight, based on the composition, of polypropylene wax having a density of at least 0.88, a melting point in the range of about 130° to 180° C. and an inherent viscosity of about .05 to about .5 in Tetralin at 145° C.

8. An α-olefin polymer blend exhibiting improved physical properties consisting essentially of (1) poly(butene-1) having a density of at least .87, a melting point in the range of about 45° to about 150° C. and an inherent viscosity in the range of about .9 to about 5 in Tetralin at 145° C. and (2) about 3 to about 50% by weight, based on the composition, of polypropylene wax having a density of at least 0.88, a melting point in the range of about 130° to 180° C. and an inherent viscosity of about .05 to about .5 in Tetralin at 145° C.

9. An α-olefin polymer blend exhibiting improved physical properties consisting essentially of (1) about 90 to about 70% by weight of polypropylene having a density of at least .87, a melting point in the range of about 45° to about 200° C. and an inherent viscosity of 4 in Tetralin at 145° C. and (2) about 10 to about 30% by weight of polypropylene wax having a density of at least 0.88, a melting point in the range of about 130° to about 180° C. and an inherent viscosity of .15 in Tetralin at 145° C.

10. An α-olefin polymer blend exhibiting improved physical properties consisting essentially of (1) about 95 to about 70% by weight of polypropylene having a density of at least .87, a melting point in the range of about 45° C. to 200° C. and an inherent viscosity of 3.5 in Tetralin at 145° C. and (2) about 5 to about 30% by weight of polypropylene wax having a density of at least 0.88, a melting point in the range of about 130° to 180° C. and an inherent viscosity of .05 in Tetralin at 145° C.

11. An α-olefin polymer blend exhibiting improved physical properties consisting essentially of (1) about 95 to about 70% by weight of polypropylene having a density of at least .87, a melting point in the range of about 45° to 200° C. and an inherent viscosity of 3.5 in Tetralin at 145° C. and (2) about 5 to about 30% by weight of polypropylene wax having a density of at least 0.88, a melting point in the range of about 130° to 180° C. and an inherent viscosity of .45 in Tetralin at 145° C.

12. An α-olefin polymer blend exhibiting improved physical properties consisting essentially of (1) about 95 to about 70% by weight of polypropylene having a density of at least .87, a melting point in the range of about 45° to about 200° C., an inherent viscosity of 1.5 in Tetralin at 145° C. and (2) about 5 to about 30% by weight of polypropylene wax having a density of at least 0.88, a melting point in the range of 130° to about 180° C. and an inherent viscosity of .1 in Tetralin at 145° C.

13. An α-olefin polymer blend exhibiting improved physical properties consisting essentially of (1) about 60% by weight of polypropylene having a density of at least .87, a melting point in the range of about 45° to about 200° C. and an inherent viscosity of 1.1 in Tetralin at 145° C., (2) about 20% by weight of polypropylene having a density of at least .87, a melting point in the range of about 45° to about 200° C. and an inherent viscosity of 1.6 in Tetralin at 145° C. and (3) about 20% by weight of polypropylene wax having a density of at least 0.88, a melting point in the range of about 130° to 180° C. and an inherent viscosity of .2 in Tetralin at 145° C.

14. An α-olefin polymer blend exhibiting improved physical properties consisting essentially of (1) about 85% by weight polypropylene having a density of at least .87, a melting point in the range of about 45° to 200° C. and an inherent viscosity of 4.2 in Tetralin at 145° C. and (2) about 15% by weight of polypropylene wax having a density of at least 0.88, a melting point in the range of about 130° to 180° C. and an inherent viscosity of 0.14 in Tetralin at 145° C.

15. An α-olefin polymer blend exhibiting improved physical properties consisting essentially of (1) about 85 to about 70% by weight of 95/5 copolymer of propylene with ethylene having a density of at least .87, a melting point in the range of about 45° to about 200° C. and an inherent viscosity of 1.6 in Tetralin at 145° C. and (2) about 15 to about 30% by weight of polypropylene wax having a density of at least 0.88, a melting point in the range of 130° to about 180° C. and an inherent viscosity of .1 in Tetralin at 145° C.

16. An α-olefin olymer blend exhibiting improved physical properties consisting essentially of (1) about 85% by weight of 90/10 copolymer of 3-methyl-1-butene with propylene having a density of at least 0.80, a melting point in the range of about 45° to about 300° C. and an inherent viscosity of 1.4 in Tetralin at 145° C., (2) about 15% by weight of polypropylene wax having a density of at least 0.88, a melting point in the range of about 130° to about 180° C. and an inherent viscosity of .1 in Tetralin at 145° C.

17. An α-olefin polymer blend exhibiting improved physical properties consisting essentially of (1) about 85 to 70% by weight of poly(1-butene) having a density of at least .87, a melting point in the range of about 45° to about 150° C. and an inherent viscosity of 1.2 in Tetralin at 145° C. and (2) about 15 to about 30% by weight of polypropylene wax having a density of at least 0.88, a melting point in the range of about 130° to about 180° C. and an inherent viscosity of .5 in Tetralin at 145° C.

18. An α-olefin polymer blend exhibiting improved physical properties consisting essentially of (1) about 80% by weight of 95/5 copolymer of 4-methyl-1-pentene with 1-butene having a density of at least 0.80, a melting point in the range of about 45° to about 250° C. and an inherent viscosity of 1.6 in Tetralin at 145° C. and (2) about 20% by weight of polypropylene wax having a density of at least 0.88, a melting point in the range of about 130° to about 180° C. and an inherent viscosity of .1 in Tetralin at 145° C.

References Cited by the Examiner

UNITED STATES PATENTS

| | | | |
|---|---|---|---|
| 2,472,495 | 6/1949 | Sparks et al. | 260—45.50 |
| 2,477,316 | 7/1949 | Sparks et al. | 260—45.50 |
| 2,628,214 | 2/1953 | Pinkney et al. | |
| 2,728,735 | 12/1955 | Anderson. | |
| 2,824,089 | 2/1958 | Peters et al. | |
| 2,924,584 | 2/1960 | Wolinski. | |
| 2,976,272 | 3/1961 | Coover et al. | 260—93.7 |
| 2,996,493 | 8/1961 | Stuart | 260—93.7 |
| 2,996,494 | 8/1961 | Cash | 260—93.7 |
| 3,018,263 | 1/1962 | Schneider | 260—897 |

FOREIGN PATENTS

| | | |
|---|---|---|
| 557,717 | 11/1957 | Belgium. |
| 602,151 | 7/1960 | Canada. |
| 850,568 | 10/1960 | Great Britain. |

MORRIS LIEBMAN, *Primary Examiner.*

ALPHONSO D. SULLIVAN, ALEXANDER H. BRODMERKEL, *Examiners.*

J. JIEGLER, D. C. KOLASCH, H. W. HAEUSSLER, *Assistant Examiners.*